United States Patent [19]

Kane

[11] 3,996,180

[45] Dec. 7, 1976

[54] HIGH SHEAR MIXING OF LATEX POLYMERS

[75] Inventor: James Kane, Park Forest, Ill.

[73] Assignee: Nalco Chemical Company, Oak Brook, Ill.

[22] Filed: Apr. 23, 1975

[21] Appl. No.: 570,988

[52] U.S. Cl. ............... 260/29.6 H; 260/29.6 WQ; 260/29.6 HN; 260/29.6 MH

[51] Int. Cl.² .......................................... C08L 33/02

[58] Field of Search ............ 260/29.6 WQ, 29.6 H, 260/29.6 HN, 29.6 MH

[56] References Cited

FOREIGN PATENTS OR APPLICATIONS

| 481,823 | 10/1948 | Canada .................... 260/29.6 MH |
| 978,875 | 12/1964 | United Kingdom ............. 260/29.6 |
| 959,131 | 5/1964 | United Kingdom ....... 260/29.6 WQ |

Primary Examiner—M. J. Welsh
Attorney, Agent, or Firm—John G. Premo; Barry W. Sufrin; Robert A. Miller

[57] ABSTRACT

Water-in-oil emulsions of water soluble vinyl addition polymers of the type comprising from:
  A. 30 to 95% by weight of the emulsion of an aqueous phase comprising water and monomer;
  B. 10 to 50% by weight of the emulsion of a water soluble vinyl addition polymer;
  C. 5 to 70% by weight of the emulsion of a hydrophobic liquid;
  D. and 0.1 to 21% by weight of the emulsion of a water-in-oil emulsifying agent;

can be rendered more stable to prolong storage by subjecting the emulsion to high shear mixing prior to polymerization.

4 Claims, 2 Drawing Figures

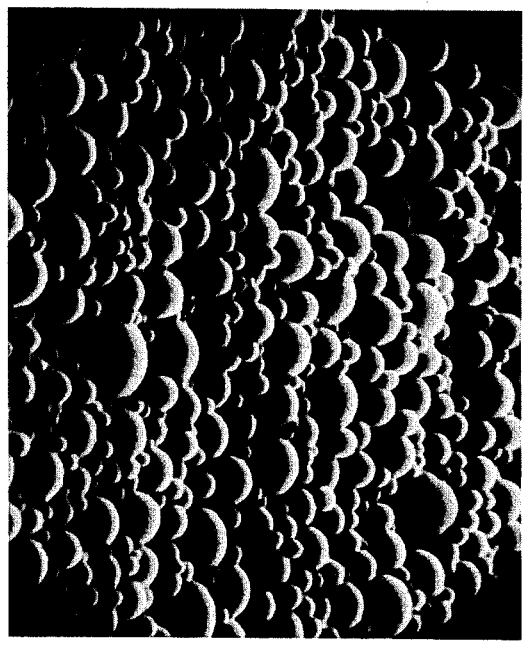
FIG. I
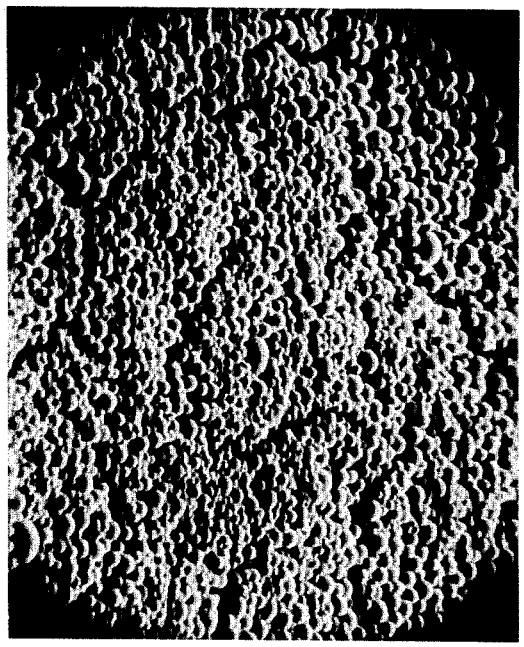
FIG. 2

HIGH SHEAR MIXING OF LATEX POLYMERS

Water-in-oil emulsions of water soluble vinyl addition polymers have been used in a great number of applications which include sludge dewatering, the clarification of waters, and a variety of other uses. The ease of invertability of these water-in-oil emulsions into aqueous systems makes them particularly important and commercially attractive over other forms of the same polymers.

The water-in-oil emulsions of water soluble vinyl addition polymers which are the subject of this invention are described in great detail in the following U.S. Patents: Vanderhoff, U.S. Pat. No. 3,284,393; Anderson et al. U.S. Pat. No. 3,624,019; Anderson et al. 3,734,873, and Anderson et al. U.S. Pat. No. 3,826,771, all of which are herein incorporated by reference to this application.

One of the great shortcomings of the invertable water-in-oil emulsions specifically taught by the Anderson et al. references has been the storage stability. Over a period of time the polymer, in the aqueous phase, tends to settle out of the emulsion and may agglomerate at the bottom of a container. While over short periods of time the polymers contained in the emulsion are readily dispersible, over times ranging from one month and more, redispersion of the settled polymer can require a great amount of mixing. It would, therefore, be an advantage to the art if a method could be found to increase the storage stability of these water-in-oil emulsions of water soluble vinyl addition polymers.

OBJECTS

It is, therefore, an object of this invention to provide to the art a method for increasing the stability of water-in-oil emulsions of vinyl addition polymers.

A further object of this invention is to provide to the art a method for increasing the storage stability of water-in-oil emulsions of vinyl addition polymers of the type comprising:

A. 30 to 95% by weight of the emulsion of an aqueous phase comprising water and monomer;
B. 10 to 50% by weight of the emulsion of a water soluble vinyl addition polymer;
C. 5 to 70% by weight of the emulsion of a hydrophobic liquid; and
D. 0.1 to 21% by weight of the emulsion of a water-in-oil emulsifying agent;

by subjecting the emulsion to high shear mixing prior to polymerization.

It is still a further object of this invention to provide to the art a method for the stabilization of water-in-oil emulsions of finely divided water soluble vinyl addition polymers by subjecting the emulsion to high shear mixing prior to polymerizing the monomer contained within the emulsion.

Other objects will appear hereinafter.

BRIEF DESCRIPTION OF THE DRAWINGS

FIG. 1 is an electronmicrograph of the particles contained in a water-in-oil emulsion prepared without the teachings of this invention.

FIG. 2 is an electronmicrograph of a water-in-oil emulsion prepared by the instant invention.

DETAILED DESCRIPTION OF THE DRAWINGS

FIG. 1, a water-in-oil emulsion of an acrylamide-acrylic acid polymer, showing a 5,000 times magnification of particles contained in this emulsion. The particle size range contained is 0.6 – 3.2 microns.

FIG. 2 shows a water-in-oil emulsion of identical composition and polymerized under identical conditions except prior to heating the emulsion was sheared in a conventional blender for 10 minutes. The electronmicrograph, FIG. 2, of this emulsion shows particles ranging in size from 0.2 – 2.0 microns with most of the particles being in the range of 0.2 to 1.0 microns.

THE WATER SOLUBLE VINYL ADDITION POLYMERS

In general, the water-in-oil emulsions of finely divided vinyl addition polymers are stable and at the same time contain relatively large amounts of polymer. The polymers dispersed in the emulsion are quite stable with the particle size of the polymer being within the range of 1 millimicron up to about 5 microns. The preferred particle size is within the range of 0.01 microns and 3 microns.

The stable water-in-oil emulsion comprises:
1. An aqueous phase;
2. A hydrophobic liquid; and
3. A water-in-oil emulsifying agent.

The polymer-containing emulsion of this invention is comprised of an aqueous phase ranging between 30 and 95% by weight of the emulsion. The aqueous phase is defined as the sum of the polymer or copolymer and the water present in the composition. The preferred range is between 70 and 90% by weight of the emulsion. The most preferred range is between 70 and 80% by weight of the emulsion.

The present invention has a polymer concentration between 10 and 50% by weight of the emulsion. A preferred range is between 25 and 40% by weight of the emulsion. The most preferred range is between 25 and 35% by weight of the emulsion.

The polymers most commonly used in application of this invention are acrylamide polymers which include polyacrylamide and its water-soluble copolymeric derivatives such as, for instance, acrylic acid, methacrylic acid, itaconic acid, acrylonitrile, and styrene. The copolymers contain from about 5 to 95% by weight of acrylamide. The molecular weights of such polymers and copolymers exceed 500,000.

A polymer also useful in the practice of this invention is hydrolyzed polyacrylamide which has from 1 to 50% of the original carboxamide groups hydrolyzed to carboxyl groups. The molecular weights of the hydrolyzed polyacrylamides range from 500,000 to 1 million or more.

The molecular weight of the polymers described above may vary over a wide range, e.g., 10,000 to 25 million. The preferred polymer has a molecular weight in excess of 1 million.

The organic or oil phase of the emulsion is comprised of an inert hydrophobic liquid. The hydrophobic liquid comprises between 5 and 70% by weight of the emulsion. The preferred range is between 5 and 30% by weight of the emulsion. The most preferred range is between 20 and 30% by weight of the emulsion.

The oils used in preparing these emulsions may be selected from a large group of organic liquids which include liquid hydrocarbons and substituted liquid hydrocarbons. A preferred group of organic liquids are hydrocarbon compounds, which contain from 4 to 8 carbon atoms. Thus, such organic hydrocarbon liquids as benzene, xylene, toluene, mineral oils, kerosenes, naphtha, and in certain instances, petroleums may be used. A particularly useful oil from the standpoint of its physical and chemical properties is the branchchain isoparaffinic solvent sold by Humble Oil and Refinery Company under the tradename "isopar M." Typical specifications of this narrow-cut isoparaffinic solvent are set forth below in Table I.

TABLE I

| Specification Properties | Minimum | Maximum | Test Method |
| --- | --- | --- | --- |
| Gravity, API at 60/60° F | 48.0 | 51.0 | ASTM D 287 |
| Color, Saybolt | 30 | — | ASTM D 156 |
| Aniline point, ° F | 185 | — | ASTM D 611 |
| Sulfur, ppm | — | 10 | ASTM D 1266 (Nephelometric mod.) |
| Distillation, ° F | | | |
| IBP | 400 | 410 | |
| Dry Point | — | 495 | |
| Flash point, ° F (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is usually present in amounts ranging between 0.1 and 21.0% by weight of the emulsion. The preferred range is between 1.0 and 15.0% by weight of the emulsion. The most preferred range is between 1.2 and 10% by weight of the emulsion.

In the choice of a suitable emulsifier, it is important to take into account variations in monomer solubility, salt content, and the reactivity of monomer groups. Also, variations may occur which dictate that emulsifiers should be tried on a case-by-case method.

While these polymers have provided a great advancement to the art as described previously their storage stability is oftentimes severely limited and it is the object of this invention to render these emulsions more stable to prolonged storage. The basic impetus of this invention calls for subjecting the emulsion, prior to polymerization, to high shear mixing so as to form a water-in-oil emulsion of a vinyl addition polymer having a smaller average particle size than has been done in the past.

In the past polymer emulsions have been subjected to high shear mixing after polymerization in order to break down the particle size and therefore stabilize them. This has oftentimes caused serious loss in molecular weight due to the shear and the molecular breakdown of the polymers in the emulsion. With my process due to the fact that the emulsion is subjected to these forces before polymerization, no such molecular weight loss is noted. Also, due to the increased number of monomer particles present in the emulsion a higher molecular weight polymer is often formed than in similar processes not undergoing the high shear mixing.

The high shear mixing techniques which I prefer to use prior to polymerization are generally well known techniques within the art and include the use of homogenizers, high speed mixers, blenders and any other means for obtaining high shear mixing. While in the use of this invention, the emulsion may become thick due to the decreased average particle size of the monomer phase contained within the emulsion. This is unimportant as long as the emulsion remains relatively pourable and does not become gell or pastelike.

The time necessary to produce emulsions having the desired monomer particle sizes may vary depending upon the particular technique employed. However, I have found that generally a short period of time is all that is necessary. As a further guide to the time employed, the shear applied to the water-in-oil emulsion should not be so great as to break the emulsion or to cause the emulsion to set up in a paste or gell-like consistency.

While I do not know the particle size of the monomer phase prior to polymerization due to the fact that conventional electron microscopy techniques are not applicable due to the "implosion" of the individual unpolymerized particles under vacuum, the average particle size of the polymer produced according to my invention is significantly smaller than those produced using the conventional means contemplated in the reference previously cited.

The average size of the polymer particles produced using the method of my invention after polymerization is in the range of from 0.01 microns to 5.0 microns. Preferably, the average particle size of the particles within the emulsion after polymerization should be in the range of 0.01 microns to 2 microns and most preferably between 0.1 and 3.0 microns. The use of techniques which will insure uniform distribution of particle size within a given size range is beneficial in my process in that by mechanically making the particles of even size greater stability can be obtained. I have found that by the use of the techniques of my invention narrow average particle size ranges are obtained and that this will suffice for the above stability requirement. It is noted that conventional electron microscopy techniques can be employed on the polymerized emulsion where they cannot be used on the monomer phase. This is due to the fact that the polymer particles do not "implode" on the application of a high vacuum necessary for removing the water and hydrophobic liquid and thus these particles can be easily studied.

In the use of my invention the emulsion can be subjected to high shear mixing either prior to or after the source of free radicals has been added to the emulsion so as to cause the polymerization. It is only important that the polymerization not be initiated until the high shear mixing step is completed and then polymerization may take place by the methods enumerated in the previous references. It is also contemplated within the course of my invention that no outside source of free radicals need be added to the water-in-oil emulsion of the vinyl addition monomer prior to the polymerization. This may be accomplished by subjecting the emulsion after it has been subjected to the high shear mixing of my invention with an outside energy source such as that of microwaves, gamma rays or other irradiating source. I have found that this will cause sufficient polymerization of the monomer contained within the water-in-oil emulsion to affect a polymerization and produce a suitable product.

As a further advantage, with the use of my improvement, generally higher molecular weights can be obtained than through conventional processes. Higher molecular weights typically achieved range in the order of from 100,000 to several million. This represents a great advance in the art due to the fact that many of the applications to which the water soluble vinyl addition polymers are put to, performance is increased through the use of higher molecular weight materials. Thus, with the improved storage stability and higher molecular weights obtainable by the use of my invention the polymer can be stored for longer periods of time without settling with the further advantage that in applications where a high molecular weight polymer is beneficial greater activity is seen using the higher molecular weight polymers of my invention.

In order to better illustrate the improvement of my invention provides as to stability of the latex polymers the following examples are presented:

EXAMPLE 1

To a 2 liter resin flask equipped with mechanical stirrer, condenser, thermometer, nitrogen inlet, and sample tube, was charged: 349 grams of an aqueous solution containing 45.3% acrylamide; 230.3 grams of water; 67.5 grams of acrylic acid; 75.0 grams of 50% NaOH; 258 grams of Isopar M; and 6.8 grams of sorbitan monolaurate and 6.8 grams of sorbitan monooleate. The mixture was stirred with a conventional laboratory mixer so as to produce an emulsion while maintaining a nitrogen atmosphere and was heated to 40 C at which time 3.0 m of a solution containing 5% Vazo 64 and 5% of Azo-52 was charged. The reaction was held at this temperature for two hours and 15 minutes at which time the polymeric solution was heated to a temperature of 46 – 47 C for an additional 2 hrs. and 45 minutes. The resulting water-in-oil emulsion was then cooled at room temperature. The polymer had an intrinsic viscosity of 17.3, a Huggins constant of 0.64 and as determined by electron microscopy had a particle size range of from 0.6–3.2 microns. This emulsion is shown enlarged 5000 times in FIG. 1.

EXAMPLE 2

The procedure of Example 1 was followed with identical conditions except that prior to heating the emulsion was sheared in a conventional blender for ten minutes. The resulting emulsion was viscous, but was not paste or gell-like. With identical heating conditions and temperatures of Example 1, the resulting water-in-oil emulsion had an intrinsic viscosity of 25.5 with a Huggins constant of 0.37. As determined by electron microscopy techniques the average particle size of the polymer contained within the water-in-oil emulsion was 0.2–2.0 microns with most of the particles in the range of 0.2–1.0 microns. This emulsion is shown enlarged 5000 times in FIG. 2.

EXAMPLE 3

Stability tests were run on the polymers of Examples 1 and 2 by using a centrifuge technique. The polymers of Examples 1 and 2 were added to graduated 20 ml centrifuge tubes and were rotated at high speed (650 r.p.m.) for various periods of time in order to provide a test which would show the accelerated aging of the emulsions during storage. The milliliters of material that separated from the emulsion are shown on the Table below. At the end of the centrifucation study (4 hours), the material was poured out of the tube for one minute and the weight of the latex which poured out of the tube was determined. It was determined that 41.3% of the material of Example 1 remained fluid while 73.1% of the material of Example 2 remained pourable. This represents a 78% increase in stability using the method of my invention.

| | MILLILITERS OF OIL PHASE SEPARATED (TOP) FROM LATEX | |
|---|---|---|
| Hours | Example 1 | Example 2 |
| 1 | 0.5 ml | 0 ml |
| 2 | 1.5 ml | 0.5 ml |
| 4 | 11.0 ml | 1.5 ml |

I claim as my invention:

1. An improvement in a method for producing a polymeric latex of the type comprising a water-in-oil emulsion which contains dispersed therein a finely divided water soluble vinyl addition polymer, said polymeric latex being produced by the known steps of:
    A. Forming a water-in-oil emulsion from:
        1. water which contains therein a water soluble ethylenically unsaturated monomer, thereby producing a monomer phase which has a concentration of from 30 – 95% by weight of the emulsion;
        2. a hydrophobic liquid in a concentration of from 5 – 70% by weight of the emulsion;
        3. a water-in-oil emulsifying agent in a concentration of from 0.1 – 21.0% by weight of the emulsion;
        4. a free radical initiator;
    B. Subjecting said emulsion to free radical forming conditions so as to polymerize the water soluble ethylenically unsaturated monomer contained in the emulsion; and then,
    C. Recovering the water-in-oil emulsion of the water soluble vinyl addition polymer; the improvement which comprises subjecting the water-in-oil emulsion of the water soluble ethylenically unsaturated monomer to high shear mixing prior to polymerization said shear not being so great as to break the emulsion or to cause the emulsion to set up in a paste or gell-like consistency, whereby the water-in-oil emulsion of the water soluble vinyl addition polymer of Step C has improved storage stability.

2. The improvement of claim 1 wherein the water-in-oil emulsion of the water soluble vinyl addition polymer has an average particle size of from 0.1 to 3.0 microns.

3. The improvement of claim 1 wherein the water soluble ethylenically unsaturated monomer is acrylamide.

4. The improvement of claim 1 wherein the high shear mixing of the water-in-oil emulsion is performed prior to the addition of free radical iniator.

* * * * *